(12) United States Patent  
Mei et al.

(10) Patent No.: US 10,648,092 B2  
(45) Date of Patent: May 12, 2020

(54) ELECTRODE, MEMBRANE ELECTRODE ASSEMBLY, ELECTROCHEMICAL CELL, AND STACK

(71) Applicant: Kabushiki Kaisha Toshiba, Minato-ku (JP)

(72) Inventors: Wu Mei, Yokohama (JP); Norihiro Yoshinaga, Kawasaki (JP); Atsuko Iida, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 110 days.

(21) Appl. No.: 15/262,106

(22) Filed: Sep. 12, 2016

(65) Prior Publication Data

US 2017/0130348 A1 May 11, 2017

(30) Foreign Application Priority Data

Nov. 10, 2015 (JP) .................................. 2015-220473

(51) Int. Cl.  
  *C25B 11/03* (2006.01)  
  *C25B 11/08* (2006.01)  
  (Continued)

(52) U.S. Cl.  
  CPC ............ C25B 11/0484 (2013.01); C25B 1/10 (2013.01); C25B 11/0405 (2013.01); C25B 13/02 (2013.01); *Y02E 60/366* (2013.01)

(58) Field of Classification Search  
  CPC . C25B 11/03–035; C25B 11/02; C25B 11/00; C25B 9/10; C25B 9/08;  
  (Continued)

(56) References Cited

U.S. PATENT DOCUMENTS

| 6,936,370 B1 * | 8/2005 | Knights .............. H01M 4/8605 429/218.1 |
| 2004/0170884 A1 * | 9/2004 | Frank .................. H01M 4/8626 429/454 |

(Continued)

FOREIGN PATENT DOCUMENTS

| JP | 2002-75382 | 3/2002 |
| JP | 2007-257888 | 10/2007 |

(Continued)

OTHER PUBLICATIONS

Sholklapper et al ("LSM-Infiltrated Solid Oxide Fuel Cell Cathodes", Electrochemical and Solid-State Letters, 2006 vol. 9, issue 8, pp. A376-A378). (Year: 2006).*

(Continued)

*Primary Examiner* — Alexander W Keeling  
(74) *Attorney, Agent, or Firm* — Oblon, McClelland, Maier & Neustadt, L.L.P.

(57) ABSTRACT

An electrode includes a base material, and a catalyst layer provided on the base material, the catalyst layer including a plurality of catalyst units having a porous structure. The catalyst layer has a first catalyst layer provided near the base material, the first catalyst layer including a plurality of the catalyst units dispersed at a first dispersion degree. The catalyst layer has a second catalyst layer provided above the first catalyst layer, the second catalyst layer including a plurality of the catalyst units dispersed at a second dispersion degree. The second dispersion degree is different from the first dispersion degree.

14 Claims, 7 Drawing Sheets

(51) Int. Cl.
*C25B 13/02* (2006.01)
*C25B 11/04* (2006.01)
*C25B 1/10* (2006.01)

(58) Field of Classification Search
CPC .......... C25B 9/06; C25B 9/00; H01M 8/1004; H01M 8/10; H01M 8/00
See application file for complete search history.

(56) References Cited

U.S. PATENT DOCUMENTS

| | | | |
|---|---|---|---|
| 2008/0230171 A1 | 9/2008 | Mei et al. | |
| 2009/0162725 A1* | 6/2009 | Terazono | H01M 4/8605 429/423 |
| 2009/0239116 A1* | 9/2009 | Okumura | H01M 4/8636 429/513 |
| 2010/0021787 A1 | 1/2010 | Wu et al. | |
| 2010/0239950 A1 | 9/2010 | Mei et al. | |
| 2012/0251915 A1* | 10/2012 | Mei | H01M 8/1004 429/479 |
| 2013/0078549 A1 | 3/2013 | Fukazawa et al. | |
| 2013/0078550 A1 | 3/2013 | Mei et al. | |
| 2013/0252132 A1 | 9/2013 | Mei et al. | |
| 2015/0104728 A1* | 4/2015 | Dale | H01M 4/9075 429/483 |
| 2016/0141696 A1* | 5/2016 | Tago | C08J 5/2237 429/408 |
| 2016/0301081 A1 | 10/2016 | Mei et al. | |

FOREIGN PATENT DOCUMENTS

| | | |
|---|---|---|
| JP | 2008-21609 | 1/2008 |
| JP | 2008-108594 | 5/2008 |
| JP | 2008-186798 | 8/2008 |
| JP | 2008-229514 A | 10/2008 |
| JP | 2010-33759 | 2/2010 |
| JP | 2010-221090 | 10/2010 |
| JP | 2012-204221 A | 10/2012 |
| JP | 5082239 | 11/2012 |
| JP | 2013-73695 A | 4/2013 |
| JP | 2013-82999 | 5/2013 |
| JP | 2013-226537 | 11/2013 |
| JP | 2015-109281 | 6/2015 |
| JP | 2015-116553 A | 6/2015 |
| WO | WO-2015002073 A1 * | 1/2015 ............ C08J 5/2237 |

OTHER PUBLICATIONS

Wu Mei et al. "Development of Alternated Catalyst Layer Structure for PEM Fuel Cells", ECS Transactions, vol. 50, No. 2, 2012, 8 pages.

* cited by examiner

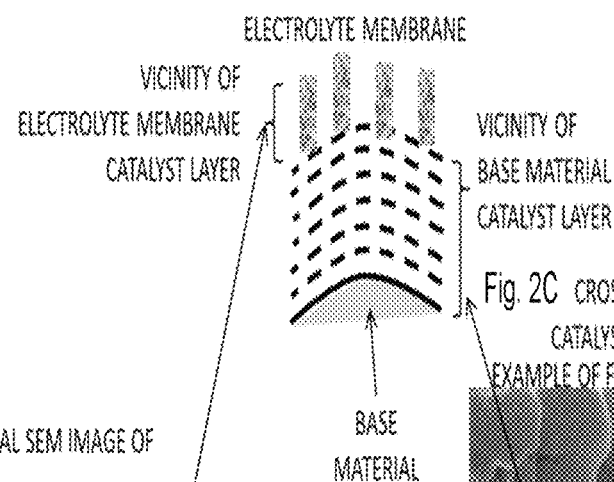

Fig. 2A IMAGE VIEW OF ELECTRODE

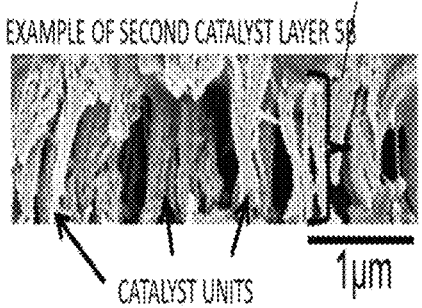

Fig. 2B CROSS SECTIONAL SEM IMAGE OF CATALYST LAYER
EXAMPLE OF SECOND CATALYST LAYER 5B

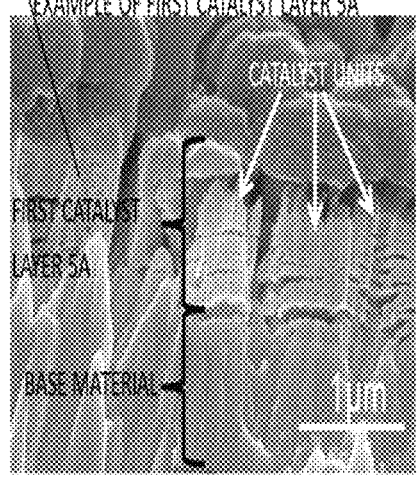

Fig. 2C CROSS SECTIONAL SEM IMAGE OF CATALYST LAYER
EXAMPLE OF FIRST CATALYST LAYER 5A

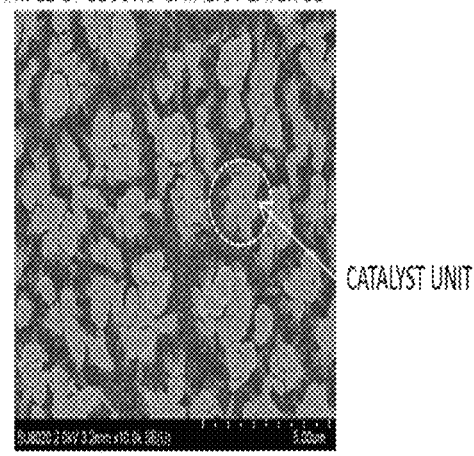

Fig. 2D CROSS SECTIONAL SEM IMAGE OF CATALYST LAYER
EXAMPLE OF SECOND CATALYST LAYER 5B

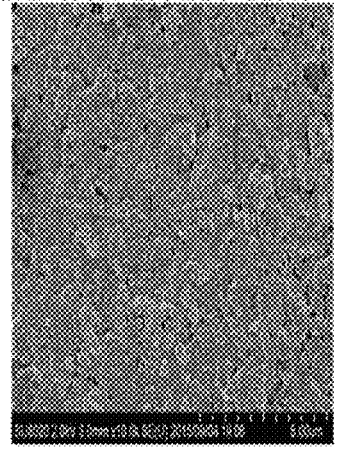

Fig. 2E CROSS SECTIONAL SEM IMAGE OF CATALYST LAYER
EXAMPLE OF FIRST CATALYST LAYER 5A

ELECTRODE, MEMBRANE ELECTRODE ASSEMBLY, ELECTROCHEMICAL CELL, AND STACK

CROSS-REFERENCE TO RELATED APPLICATION

This application is based upon and claims the benefit of priority from Japanese Patent Application No. 2015-220473, filed on Nov. 10, 2015; the entire contents of which are incorporated herein by reference.

FIELD

Embodiments described herein relate to an electrode, a membrane electrode assembly, an electrochemical cell, and a stack.

BACKGROUND

Electrochemical cells have recently been actively studied. Among electrochemical cells, for example, because a polymer electrolyte electrolysis cell (PEMEC) is superior in responsivity to renewable energy such as photovoltaic generation, the PEMEC is expected to be used for generating hydrogen for a large scale energy storage system. Platinum nanoparticle catalyst and particulate iridium series catalyst have been typically used for the negative electrode and the positive electrode of the PEMEC, respectively, to secure sufficient durability and electrolytic performance.

One major issue to spread the PEMEC is cost reduction by reducing the amount of noble metal catalyst to be used.

Carrierless catalyst units having a porous structure or a laminated structure including a void layer have recently been proposed as a noble metal catalyst for an electrochemical cell. The configuration of the catalyst included in the catalyst units is in a sponge-like state or a nanosheet-like state, and it has been reported that the catalyst units have high durability. Furthermore, because porosity of the catalyst layer including the catalyst units is high, the catalyst layer is advantageous in material motion indispensable for electrode reaction of electrochemical cell, and is probably a leading technique for reducing the amount of noble metal. However, when the above technique is applied to a PEMEC, stability of water electrolysis performance is still insufficient, so that further improvement is needed.

BRIEF DESCRIPTION OF THE DRAWINGS

FIG. 2A is a diagram illustrating an electrode according to the embodiment;

FIG. 2B is a an SEM photograph illustrating the electrode according to the embodiment;

FIG. 2C is a an SEM photograph illustrating the electrode according to the embodiment;

FIG. 2D is a an SEM photograph illustrating the electrode according to the embodiment;

FIG. 2E is a an SEM photograph illustrating the electrode according to the embodiment;

DETAILED DESCRIPTION

Figure 1:
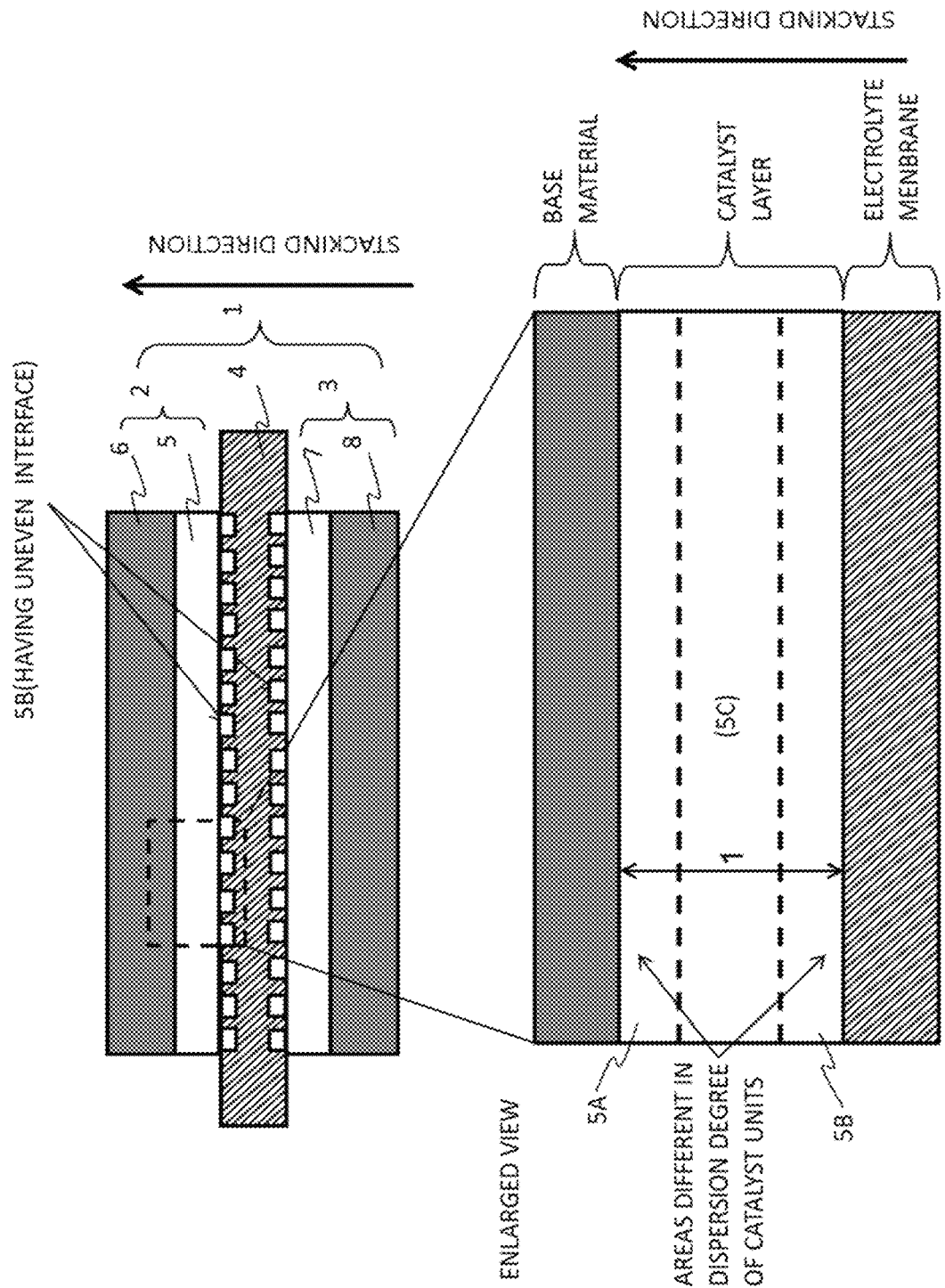
FIG. 1 is a cross sectional view of a membrane electrode assembly (MEA) according to an embodiment.

An electrode includes a base material, and a catalyst layer provided on the base material, the catalyst layer including a plurality of catalyst units having a porous structure. The catalyst layer has a first catalyst layer provided near the base material, the first catalyst layer including a plurality of the catalyst units dispersed at a first dispersion degree. The catalyst layer has a second catalyst layer provided above the first catalyst layer, the second catalyst layer including a plurality of the catalyst units dispersed at a second dispersion degree. The second dispersion degree is different from the first dispersion degree.

Hereinafter, an embodiment will be described with reference to the drawings.

Note that the same reference numerals are used for the same elements, etc., and the description of the elements, etc. once described is omitted appropriately.

FIG. 1 illustrates a cross sectional view of a membrane electrode assembly (MEA) according to the embodiment.

The MEA 1 includes a first electrode 2, a second electrode 3, and an electrolyte membrane 4 interposed therebetween.

The first electrode 2 adjacent to the electrolyte membrane 4 includes a first gas diffusion layer (base material) 6 and a catalyst layer 5 laminated in this order from the top of the drawing. The second electrode 3 includes a second gas diffusion layer (base material) 8 and a catalyst layer 7 laminated in this order from the bottom of the drawing. Herein, the catalyst layer 5 has a multilayer structure in which a first catalyst layer 5A near the base material 6, an intermediate catalyst layer (intermediate layer) 5C, and a second catalyst layer 5B near the electrolyte membrane 4 are laminated, and each catalyst layer has a porous structure including a number of catalyst units. The porous structure denotes a structure including a number of holes existing between catalyst units or inside catalyst units. The shape of the holes is not specifically limited. Each catalyst unit has a porous structure and/or a laminated structure including a void layer. Supposing that the base material 6 is the bottom, the first catalyst layer 5A exists on the base material 6, and the second catalyst layer 5B exists at an upper portion of the first catalyst layer 5A. The upper portion shall include both of the case of existing at an upper portion via the intermediate layer 5C and the case of simply existing on the upper portion of the first catalyst layer 5A. That is, the first catalyst layer 5A exists between the base material 6 and the second catalyst layer 5B. It is preferable that the intermediate layer 5C formed of one layer or multiple layers be included between the first catalyst layer 5A and the second catalyst layer 5B.

The feature of the embodiment is that the catalyst units included in the second catalyst layer 5B near the electrolyte membrane 4 are dispersed more than the catalyst units included in the first catalyst layer 5A near the base material 6. This makes it possible to make the base material 6 and the electrodes keep high durability and form an uneven interface between the catalyst layer 5 and the electrolyte membrane 4 to yield stable water electrolysis performance.

Hereinafter, the catalyst layer 5 of the embodiment will be described in detail. Note that, although the catalyst layer 5 of the first electrode 2 will be described, the catalyst layer 7 of the second electrode 3 may have the structure same as the catalyst layer of the first electrode 2.

The catalyst layer 5 according to the embodiment includes a plurality of carrierless catalyst units having a porous structure or a laminated structure including a void layer, and has a high catalyst specific surface area (10 to 40 $m^2/g$), a high porosity (not less than 70 vol %), and a superior durability. The carrierless means that a carrier is not used for the catalyst structuring the catalyst layer. One feature of the above catalyst layer is that the catalyst in the catalyst unit is practically continued and the catalyst units are partially coupled in many cases, so that the catalyst layer 5 is in a structurally highly stable state. In a conventional catalyst layer including catalyst or catalyst particles carried by a carrier, its porosity is less than 70 vol % (volume %), making its structural stability insufficient. For the positive electrode of a conventional PEMEC, iridium black or iridium black oxide is used, and although the positive electrode is carrierless, its particle diameter is more than several tens nm in many cases. Because material transportation indispensable to electrode reaction largely depends on the porosity of the catalyst layer 5 and the reaction area of the electrode is proportional to the specific surface area of the catalyst, a large amount of catalyst is used to achieve sufficient water electrolysis efficiency and durability. Note that the diameter in the embodiment denotes a circumscribed circle diameter.

In the case where the catalyst unit included in the catalyst layer 5 according to the embodiment is a porosity body, not less than 80% (the rate of the number of units) of the catalyst included in the catalyst unit is an aggregation in which catalyst particles having a diameter of not less than 2 nm and not more than 8 nm, and micropores having a diameter of not less than 1 nm and not more than 5 nm are mixed, and the catalyst can be called sponge-like catalyst. In the case where the above catalyst unit has a laminated structure including void layers, the catalyst unit has a laminated structure mainly including a plurality of nanosheet-like catalysts and void layers each existing between the two corresponding nanosheet-like catalysts. The configuration of the nanosheet-like catalyst is a continuous film, a porous film including holes having a diameter of 2 nm to 30 nm, or a continuous aggregation sheet body structured by particles having diameters of 2 nm to 8 nm depending on the composition or the like of the catalyst. It is preferable that the first catalyst layer 5A have a catalyst structure in which sheet like structures extending in the direction perpendicular to the laminated direction are laminated. Furthermore, it is preferable that the second catalyst layer 5B have a catalyst structure in which columnar structures extending in the laminated direction of the first catalyst layer 5A are bundled. Preferably, the second catalyst layer 5B having such a columnar structure has a structure extending in the direction to the electrolyte membrane 4 from the first catalyst layer 5A, and physically connects the intermediate layer 5C or the first catalyst layer 5A and the electrolyte membrane 4.

It is preferable that the porosity of the catalyst layer 5 according to the embodiment be not less than 50 vol % and not more than 95 vol %. It is preferable that the porosity of the catalyst layer 5 be not less than 70 vol % and not more than 95 vol % from the viewpoint of structural stability, because the range of the porosity of the catalyst layer 5 allows substances to adequately move without lowering the usage efficiency of noble metal. As for the diameter of the catalyst in the catalyst unit, crystal grain diameter is obtained by X-ray diffraction analysis in the case of crystalline body. The crystal diameter of platinum or iridium oxide is 2 to 20 nm in many cases.

The catalyst layer 5 of the embodiment, as its feature, has different dispersion degrees between the vicinity of the base material 6 and the vicinity of the electrolyte membrane 4, and includes catalyst units having a low dispersion degree near the base material 6 and catalyst units having a high dispersion degree near the electrolyte membrane 4.

The dispersion degree denotes a distance between the catalyst units, and high dispersion degree denotes that the distance between the catalyst units is separated, and low dispersion degree denotes that the distance between the catalyst units is close. The dispersion degree denotes an average distance of the direction that is parallel on the plane of the base material 6 facing the catalyst layer 2, between the catalyst units. A first dispersion degree of the first catalyst layer 5A is different from a first dispersion degree when a difference between the average distance of the catalyst units of the first catalyst layer 5A and the average distance of the catalyst units of the second catalyst layer 5B is 10 nm or more.

The dispersion degree of the catalyst units existing near the base material 6 is important specifically for the durability of the positive electrode of a PEMEC. It is preferable that the dispersion degree of the catalyst units near the base material 6 be low like the embodiment in the points of lifetime and durability of the base material 6 and the whole electrode.

Increasing the dispersion degree of the catalyst units of the second catalyst layer 5B near the electrolyte membrane 4 makes each catalyst unit deeply bite into the electrolyte membrane 4 when manufacturing the MEA. This forms an uneven interface between the second catalyst layer 5B and the electrolyte membrane 4 and increases contact area between the catalyst layer 5 and the electrolyte membrane 4, making it possible to yield stable water electrolysis performance. It is desirable that the catalyst layer 7 of the second electrode 3 also have a structure similar to the structure of the above catalyst layer 5.

As illustrated in the enlarged view in FIG. 1, given that the thickness of the entire catalyst layer 5 is 1, it is preferable that the area near the interface between the electrolyte membrane 4 and the catalyst layer 5 among the areas different to each other in dispersion degree of catalyst units, for example at least the area from the interface to 0.1 in the thickness, be the area different in dispersion degree (for example, area having a high dispersion degree). The high dispersion degree of the catalyst in the area yields an electrode having high durability. It is not preferable that the area having a high dispersion degree exists at more than 0.3 from the interface in its thickness because of lowering the durability. Thus, it is preferable that the area having high dispersion degree exist in the area from the interface to 0.3 in the thickness. It is preferable that the area having a high dispersion degree be formed of the second catalyst layer 5B. Furthermore, it is desirable that the vicinity of the interface between the base material 6 and the catalyst layer 5, for example the area from the interface to at least 0.1 in its thickness, be an area having a different dispersion degree (for example, area having a low dispersion degree). It is preferable that such an area having a low dispersion degree exist in the area from the interface to 0.9 in its thickness because such an area contributes to high durability and high catalytic ability even when the area is thick. It is desirable that the area having a low dispersion degree be formed of the first catalyst layer 5A.

The catalyst layer 5 may include the intermediate layer between the catalyst layers different in dispersion degree.

Although the dispersion degree of the catalyst units in the intermediate layer 5C in the intermediate area is not specifically limited, it is preferable that, for example, the dispersion degree be lower than the dispersion degree of the second catalyst layer 5B. Alternatively, the intermediate area or the intermediate layer 5C may have a region or a structure in which its dispersion degree gradually decreases toward the first catalyst layer 5A side from the second catalyst layer 5B side.

FIG. 2A is a cross sectional image view of the electrode according to the embodiment, and FIGS. 2B to 2E each are an SEM photograph of a relevant portion of the electrode according to the embodiment. FIG. 2A is an image view of the catalyst layer 5 in which the base material 6, the first catalyst layer 5A, and the second catalyst layer 5B are laminated in this order. FIG. 2B illustrates a cross sectional SEM photograph of the catalyst units of the second catalyst layer 5B having a high dispersion degree near the electrolyte membrane illustrated by 5B in FIG. 1. On the other hand, FIG. 2C illustrates a cross sectional SEM photograph of the catalyst units of the first catalyst layer 5A having a low dispersion degree near the base material illustrated by 5A in FIG. 1. FIG. 2D illustrates a cross sectional SEM photograph of the catalyst units of the second catalyst layer 5B having a high dispersion degree. FIG. 2E illustrates a cross sectional SEM photograph of the catalyst unit of the first catalyst layer 5A having a low dispersion degree. Note that FIG. 2B and FIG. 2C each are a cross sectional image in a direction perpendicular to the main face of the base material 6. Furthermore, FIG. 2D and FIG. 2E are cross sectional images in a direction perpendicular to the cross sections of FIG. 2B and FIG. 2C, respectively. Each portion has a difference in dispersion degree of catalyst units. Catalytic region and the rest of the void region are determined from the contrast of the SEM photograph. White area represents the catalyst, the black area represents the void. For determining distance of the catalyst unit, 100,000 times magnified SEM photographs are used. The catalyst unit present in the depth direction than the cross-section is distinguished by the focus and shade and is excluded from the analysis of the distance between the catalyst units.

An embodiment is also conceivable in which, in contrast to the embodiment, the catalyst layer 5 has the catalyst units having a high dispersion degree near the base material 6 and has the catalyst units having a low dispersion degree near the electrolyte membrane 4 or the surface region.

In this case, the dispersion degree of the catalyst units near the base material 6 is made high, advantageously making water supply to the electrode smooth and eliminating waste in movement of ions to the electrolyte membrane 4. However, when the dispersion degree of the catalyst units near the base material 6 is high and a gap between catalyst units is large, possibility that the electrode deteriorates is high. The deterioration mechanism is not fully unraveled yet, but this is probably because the base material is affected by liquid or proton.

In the embodiment, the dispersion degree of catalyst units is defined by using average distance between the catalyst units.

It is desirable that the average distance between the catalyst units of the second catalyst layer 5B near the electrolyte membrane 4 or the surface region be not less than 30 nm and not more than 2000 nm, and the average height of the catalyst units thereof be not less than 30 nm and not more than 1000 nm. Furthermore, it is desirable that the average distance between the catalyst units of the first catalyst layer 5A near the base material 6 be not less than 0 nm and less than 30 nm.

When the average distance between the catalyst units of the second catalyst layer 5B is less than 30 nm, or when the average height of the catalyst units thereof is less than 30 nm, stability of performance is insufficient. Furthermore, improvement of stability effects is small and manufacturing cast is high in many cases when the average distance between the catalyst units of the second catalyst layer 5B exceeds 2000 nm, or when the average height of the catalyst units thereof exceeds 1000 nm. From the same viewpoints, it is more desirable that the average distance between the catalyst units of the second catalyst layer 5B be not less than 100 nm and not more than 500 nm, and the average heights of the catalyst unit thereof be not less than 50 nm and not more than 800 nm. Furthermore, when the average distance between the catalyst units of the first catalyst layer 5A is not less than 20 nm, stability of performance is insufficient. When distance of direction of thickness between the catalyst units of the first catalyst layer 5A is less than 5 nm or less, the catalyst is made to be too dense, lowering catalytic ability. From this viewpoint, it is desirable that the average distance between the catalyst units of the first catalyst layer 5A be not less than 0 nm and not more than 20 nm. Pores or open areas whose size (diameter) is more than 5 μm may exist on the surface of the base material in contact with the catalyst units. These catalyst units have the distance between these catalyst units and dispersion degree of these catalyst units. However, the dispersion degree of these catalyst units has structurally different dispersion degree as compared with the above explained dispersion degree. Therefore, the distance between the catalyst units which is more than 3 μm is excluded from determination of the dispersion degree.

In the embodiment, to quantitatively evaluate the above height of the catalyst units or the distance between the catalyst units, definitions are made as described below. After an SEM photograph of a cross section of the electrode is photographed and the vicinity of the electrolyte membrane 4 and the vicinity of the base material are distinguished on the basis of the above structural characteristics of the catalyst layer 5 in the SEM photograph, the interfacial surface between the catalyst units near the electrolyte membrane 4 and other catalyst units shall be a reference line 62 as illustrated in the image view of FIG. 3. The height of the catalyst unit is a length in a direction perpendicular to the reference line, and the maximum distance 63 among the distances form the respective surface points of each of the catalyst units to the reference line 62 is defined as the height of the catalyst unit.

As for the distance between the catalyst units, on the surface of each of the catalyst units, a center line is obtained at a position that is a half of the height of the catalyst unit, and the shortest distance between the center lines of the adjacent catalyst units in the SEM photograph is defined as a distance 61 between catalyst units.

When all of the catalyst units are separated in the SEM photograph, the distance between catalyst units is simply determined. However some of adjacent catalyst units may have contact area. The catalyst units having contact area are treated single catalyst unit or a plurality of catalyst units is determined as following rule. In SEM photograph, a length of an edge of one catalyst unit in the left side of the SEM photograph having a contact area with catalyst unit is $L_A$. In SEM photograph, a length of an edge of another catalyst unit in the right side of the SEM photograph having a contact area with the one catalyst unit is $L_B$. In SEM photograph, a length of contact area is $L_0$. When $L_A$, $L_B$, and $L_0$ satisfies $2 \times L_0 (L_A+L_B) > 0.7$, the one catalyst unit and the other catalyst unit is treated as single catalyst unit. This determination for treating adjacent catalyst units is single unit or not is executed from left side to right side in the SEM photograph. When neighboring catalyst units is determined a plurality of catalyst units and the distance 61 between the plurality of catalyst units by above method is zero, the distance of the plurality of the catalyst units becomes zero.

Figure 3:
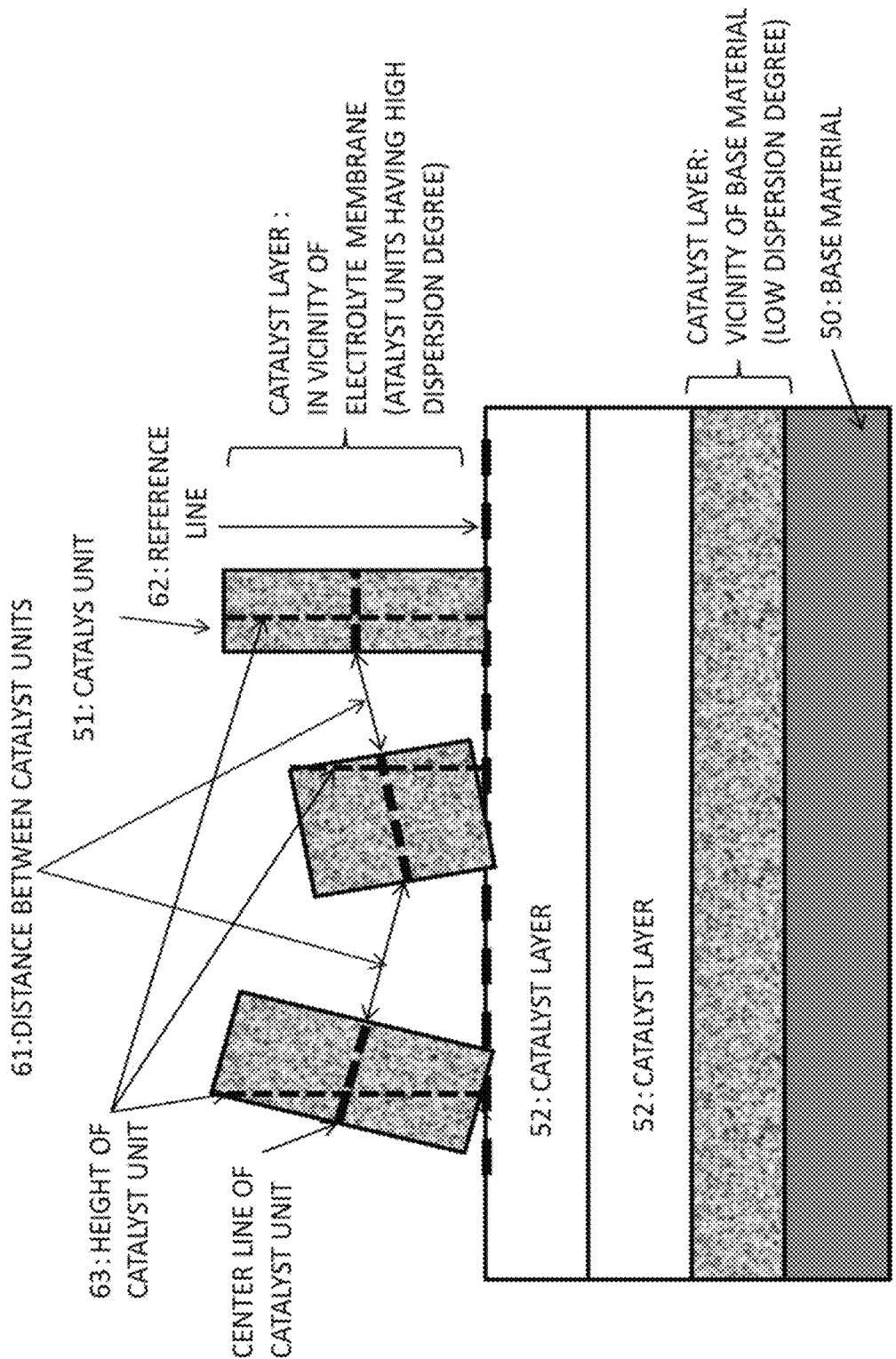
FIG. 3 is an explanatory view for defining a height of catalyst units and a distance between the catalyst units according to the embodiment.
Figure 8:
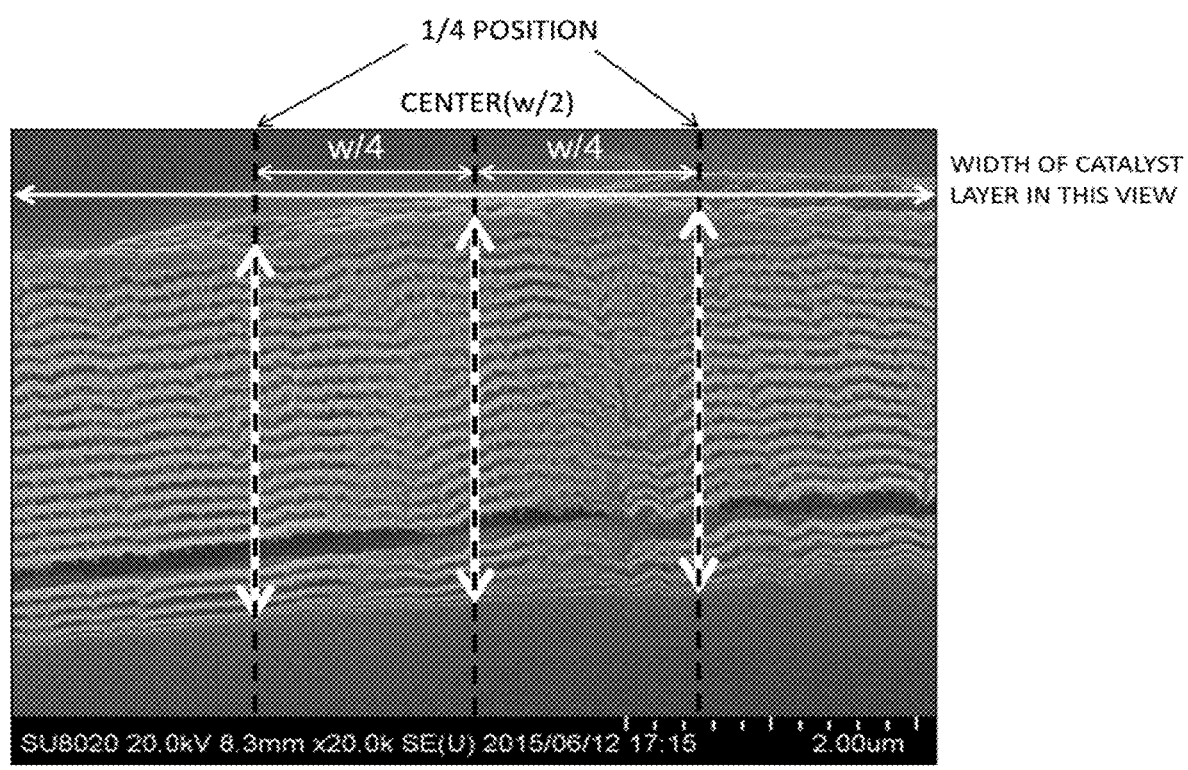
FIG. 8 is an explanatory view for defining the thickness of a catalyst layer according to the embodiment.

FIG. 3 is an explanatory view imaging the second catalyst layer 5B. A method for determining distance between catalyst units of the first catalyst layer 5A is similar to that of the second catalyst layer 5B. Explanation of common method of the second catalyst layer 5B and the first catalyst layer 5A is omitted. When the first catalyst layer 5A has a structure having stacked planer catalyst, for example SEM photograph shown in FIG. 8 may be observed. When thickness of entirely of the catalyst layer 5 is 1, distance between catalyst units exist at the thickness of 0.1 in the direction from the base material 6 to the second catalyst layer 5B or exist most neighbor from the thickness of 0.1 in the direction from the base material 6 to the second catalyst layer 5B is distance between the catalyst units of the first catalyst layer 5A. Then, executing the determination that adjacent catalyst units is single unit or not, most of the catalyst units are treated as single catalyst unit. Distance between the catalyst units directed to stacking direction is not included in the distance between the catalyst units. When all of the catalyst units is in contact (satisfying $2 \times L_0 (L_A+L_B) > 0.7$), the distance between the catalyst units is zero. The catalyst layer having the distance between the catalyst units is zero is ultimately low dispersed.

The average distance between catalyst units of the first catalyst layer 5A is expressed D1. The average distance between catalyst units of the second catalyst layer 5B is expressed D2. D1 and D2 is preferably satisfies $0.00 \leq D1/D2 \leq 0.01$. If such relation is satisfied, catalyst performance improves because of superior diffusibility of the gas as well as water. More preferable range is $0.000 \leq D1/D2 \leq 0.006$.

Figure 4:
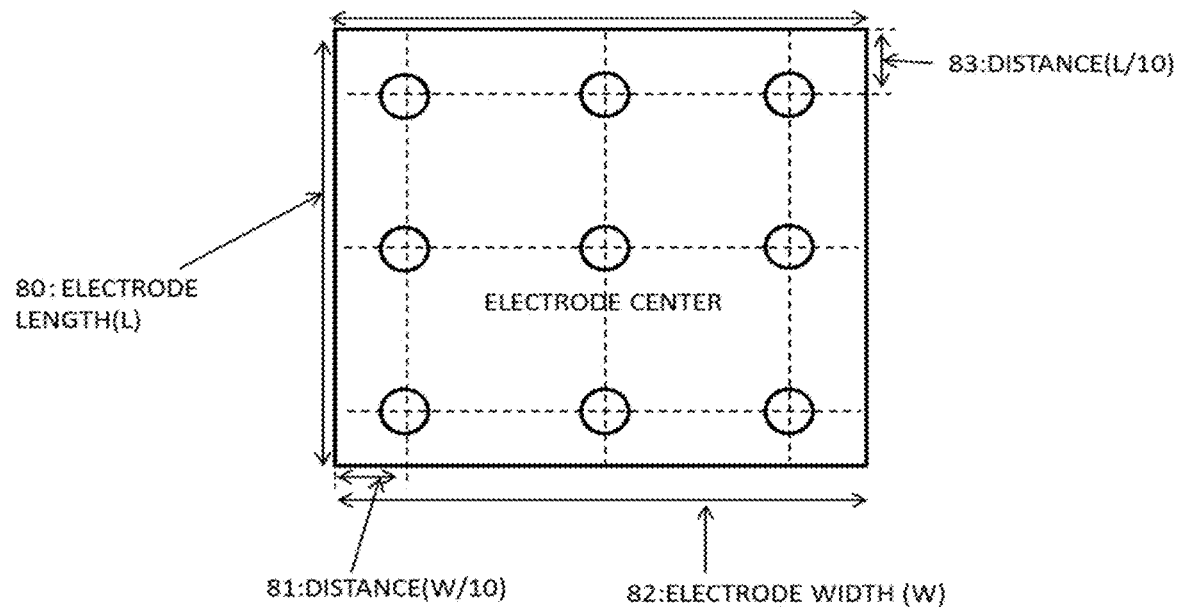
FIG. 4 is a diagram illustrating measurement spots of the electrode according to the embodiment.

As for the average height of the catalyst units or the average distance between the catalyst units, nine spots are specified in the surface of the catalyst layer 5 illustrated in FIG. 4, and the average value of the height of the catalyst units in the nine spots and the average value of the distance between the catalyst units in the nine spots shall be defined as average height and unit average distance of the electrode, respectively. Each spot has a square shape and has an area of at least 5 $mm^2$. Furthermore, given that an electrode length 80 and an electrode width 82 are L and W, respectively, a distance 81 and a distance 83 shall be W/10 and L/10, respectively.

A predetermined catalyst material employed for the catalyst layer 5 of the embodiment can be selected as appropriate depending on the electrode reaction. From the viewpoints of the catalyst activity and durability, it is desirable that the catalyst material be a noble metal or noble metal oxide catalyst. For example, when the catalyst material is used as the positive electrode of PEMEC, the catalyst having a composition indicated by $A_u M_v X_{1-u-v}$ is desirable. Herein, $0.5 \leq u+v < 1.0$ is satisfied, u satisfies $0.5 \leq u < 1.0$, v satisfies $0 \leq v < 0.5$, element A is at least one selected from noble elements such as Ir, Pt, Ru, Rh, Os, Pd, Au, etc., element M is at least one selected from the group of Ta, W, Hf, Si, Mo, Ti, Zr, Nb, V, Cr, and Sn, and element X is at least one selected from the group consisting of; Co, Ni, Fe, Mn, Al, and Zn. The above material can be also used as a metal or an oxide, and may be a compound oxide or a mixed oxide including not less than two types of metals. Although the crystal structure of the catalyst is not specifically limited, crystalline body often has good durability as compared with amorphous. It is preferable that the intermediate layer also be a layer including crystal and amorphous of the catalyst material of the catalyst layer.

When the electrode of the embodiment is applied to the positive electrode for water electrolysis, it is desirable that not more than 50 vol % of the catalyst layer near the electrolyte membrane 4 be platinum, and not less than 60 vol % of the catalyst layer 5 near the base material 6 be an oxide catalyst including iridium oxide as a primary component thereof. The structure, elements, and oxide distribution of the catalyst layer 5 can be confirmed by element mapping by a transmission electron microscope (TEM). When the catalyst layer 5 near the base material 6 includes catalyst units having a laminated structure including a void layer and a catalyst layer, arrangement of a layer formed of a noble metal such as platinum between oxide catalyst layers including, for example, iridium oxide inside the catalyst unit, or using a layer in which iridium oxide and platinum are mixed can make it possible to further improve water electrolysis stability. The mechanism is unclear, but proton conduction or electric conduction may be improved.

Porous property and conductive property are generally required for the base material 6 of the electrode. When the base material 6 is used for the positive electrode of water electrolysis cell, a titanium material is generally employed to secure the durability. Although the configuration of the base material is not specifically limited, the configuration includes titanium mesh, cloth formed of titanium fiber, and titanium sintered body. In some cases, the water electrolysis performance may be improved by adjustment of the aperture ratio of a porous base material, hole structure of the portion in contact specifically with catalyst layer, or the like, or surface treatment of base material such as blast treatment. The improvement probably occurs because water supply to the catalyst layer, discharge of electrode reaction product, etc. become smooth, facilitating electrode reaction in the catalyst layer. Another coating layer may be provided on the base material. A delicate coating layer having conductive performance can largely improve the durability of the electrode. Although the coating layer is not specifically limited, a metal material, an oxide, a ceramic material such as a nitride, carbon, or the like can be used.

When a metal material such as titanium is used as the base material, the durability of the base material 6 can be improved by, for example, introducing the above coating as a base material protection layer on a surface of the base material 6. Making the base material protection layer form a multi layered structure formed of different materials or form an inclined structure makes it possible to further improve the durability of the base material 6. When titanium is used for the base material, an oxide layer including iridium having a thickness of not less than 10 nm is specifically effective as the base material protection layer. This is probably because a dense composite oxide layer of iridium and titanium is formed in the base material protection layer.

Ion conductivity is often required for the electrolyte membrane 4. As for the electrolyte membrane having proton conductivity, for example, fluorine resin having sulfonate group (for example, Nafion (manufactured by Du Pont Co., Ltd.), Flemion (manufactured by Asahi-Kasei Co., Ltd.), or Ashiburekku (manufactured by Asahi Glass Co., Ltd.)), or inorganic material such as tungsten acid or phosphotungstic acid may be used.

The thickness of the electrolyte membrane 4 can be appropriately determined in consideration of the performance of MEA. From the viewpoints of strength, solubility resistance, and output performance of MEA, the thickness of the electrolytic membrane is preferably not less than 10 μm and not more than 200 μm.

Figure 5:
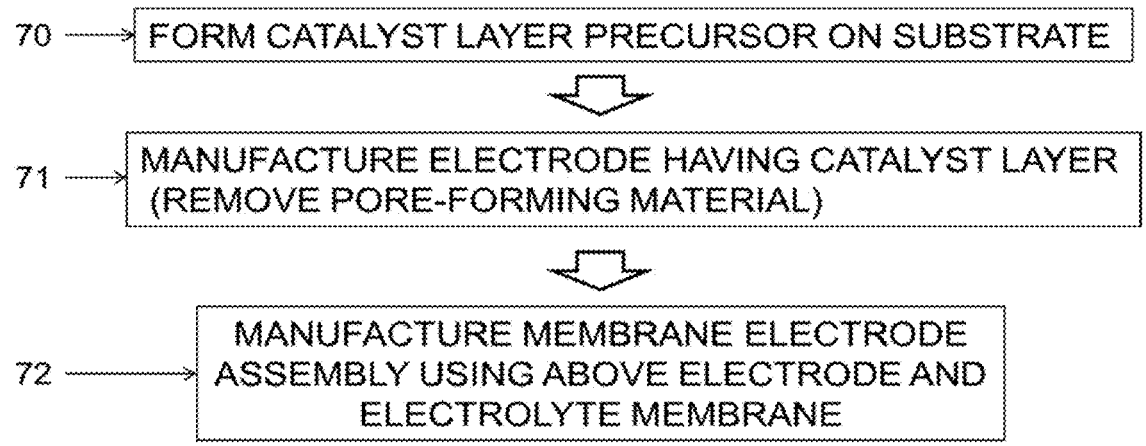
FIG. 5 is a diagram schematically illustrating a method of manufacturing the electrode and the membrane electrode assembly of the embodiment.

A manufacturing method of the electrode and the MEA according to the embodiment will be simply described (FIG. 5).

As for the electrode, first, sputtering a material including a catalyst material, and a pore-forming agent material on a base material by sputtering or vapor deposition to manufacture a catalyst layer precursor. Next, the pore-forming agent is removed to yield an electrode. Basically, in the case of a laminated structure precursor having a void layer, a material including a catalyst material, and a pore-forming agent material are sequentially formed on a base by spattering or vapor deposition. In the case of a porous structure precursor, catalyst material and pore-forming material can be formed on a base by spattering or vapor deposition at the same time. The catalyst layer having catalyst units having a high dispersion degree can be manufactured by adjusting the ratio between catalyst material and pore-forming material, a removal process of pore-forming material, or the like. Although depending on the composition of the catalyst, manufacturing often becomes easy by increasing the ratio of pore-forming material. Spattering or vapor deposition may be performed in a state where a porous mask is placed on the catalyst layer having catalyst units having a low dispersion degree. A catalyst layer having catalyst units having high dispersion degree can be manufactured by adjusting the porosity of the porous mask and the circumscribed circle diameter of the holes.

In the case of manufacturing the catalyst layer including an oxide such as iridium oxide catalyst, a reaction sputtering process such as adding oxygen gas in a chamber during sputtering or vapor deposition can be employed. The durability of electrode and the performance of electrochemical cell can be largely improved by optimizing parameters such as partial pressure of oxygen gas, power of electric source during spattering or vapor deposition, and temperature of substrate. Furthermore, performing a post processing such as heat processing after removal of pore-forming agent makes it possible to improve the activity and durability of catalyst to improve the structure of the catalyst layer.

Forming the catalyst layer directly on a base material formed of titanium or the like makes it possible to form a dense interface layer between the catalyst layer and the base material, making it possible to considerably suppress deterioration of the base material as a base material protection layer. This makes the electrode have superior durability.

The MEA according to the embodiment is manufactured by using the above catalyst layer as at least one of the first and second catalyst layers 5, 7 in FIG. 1 and combining the above catalyst layer with the electrolyte membrane. A bonding process of the catalyst layer and the electrolyte membrane is important to form uneven interface between the catalyst layer and the electrolyte membrane of the MEA of the embodiment. This bonding process makes it possible to control bite amount of the catalyst units into the electrolyte membrane, and bite distribution and degree of uniformity of catalyst units of the entire catalyst layer.

The catalyst layer and the electrolyte membrane are typically bonded by application of heat and pressure to manufacture the membrane electrode assembly. When the formation base material of the catalyst layer is a gas diffusion layer in both electrodes of the membrane electrode assembly, the electrolyte membrane 4 is sandwiched by the electrode including the catalyst layer 5 and the electrode including the catalyst layer 7 for lamination as illustrated in FIG. 1 to yield the MEA 1 by bonding. When the formation base material of the catalyst layer is a transfer substrate, the MEA 1 can be manufactured by disposing a gas diffusion layer on the catalyst after the catalyst layer is transferred from the transfer substrate to the electrolyte membrane by applying heat and pressure, and by bonding the electrode and its counter electrode.

The above bonding of the members is generally performed by using a hot press machine. The press temperature is higher than a glass-transition temperature of the high-polymer electrolyte used as binder in the electrodes 2, 3 and electrolyte membrane 4, and typically is not less than 100° C. and not more than 300° C. Although the press pressure and press time depend on the hardness of the electrodes 2, 3, the pressure typically is not less than 5 kg/cm$^2$ and not more than 200 kg/cm$^2$, and the time typically is 5 s to 20 min. To precisely control the bite amount of the catalyst units, adjustment of parameters of the hot press machine is important. Local temperature or local pressure of a hot plate of the hot press machine is controlled in tune with physical property and flatness of the base material with catalyst layer to obtain the optimum amount, distribution, and evenness of bite.

Note that the following process may be employed to bond the catalyst layer and the electrolyte membrane. An electrolyte membrane is formed on the base material with a catalyst layer, and a catalyst layer of the counter electrode is attached thereon. When the base material is a gas diffusion layer, the bonded electrodes can be used as MEA 1 without change. When the base material is a transfer substrate, the bonded electrodes is used as the MEA 1 after the transfer substrate is replaced by a gas diffusion layer. In this case, bite of the catalyst units can be controlled by the concentration and configuration of the solvent for forming electrolyte membrane, formation temperature and time, etc.

As described above, the MEA 1 according to the embodiment has high water electrolysis stability because of using the optimum electrode-electrolyte membrane interface.

Note that it is also possible to control bite of catalyst units into the electrolyte membrane by assembling of the cell, for example, by fastening pressure in a direction perpendicular to the MEA.

Figure 6:
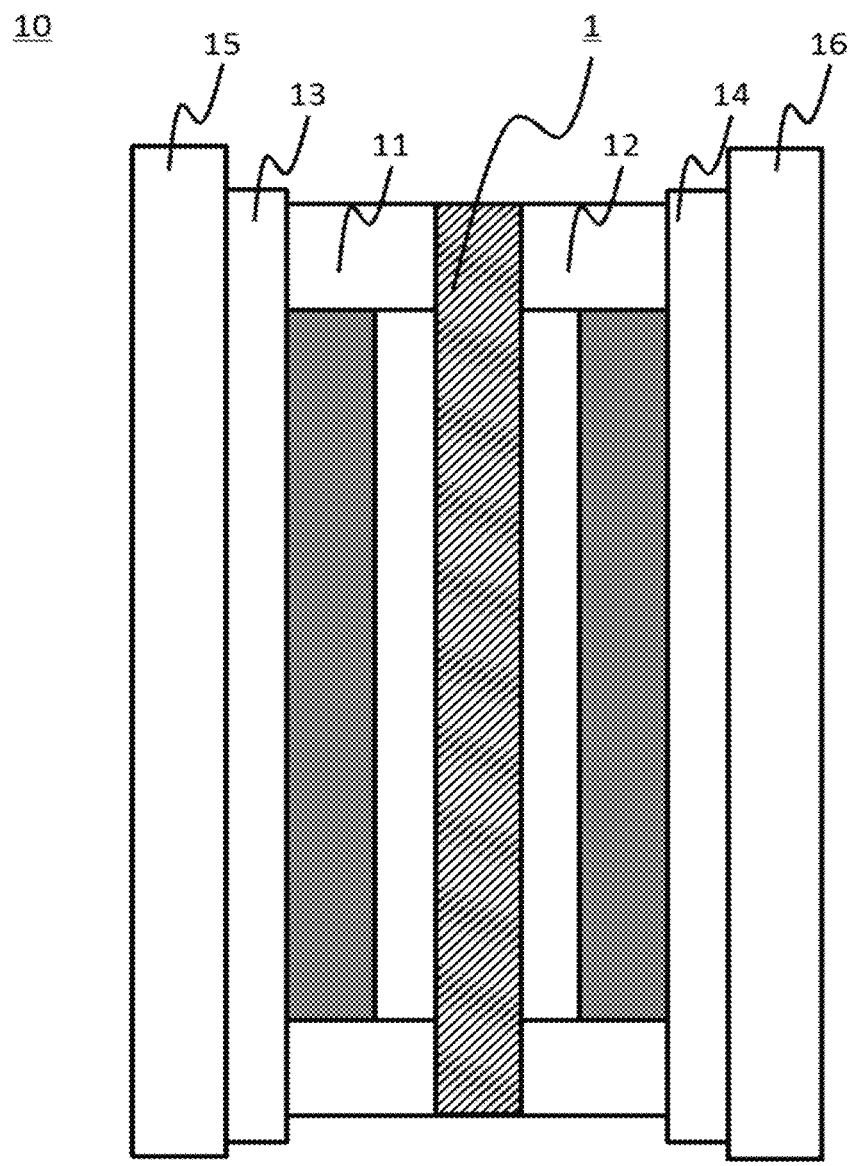
FIG. 6 is a sectional view of an electrochemical cell according to an embodiment.

The configuration and the manufacturing method of an electrochemical cell according to the present embodiment will briefly be described using FIG. 6. The electrochemical cell 10 includes MEA1, gaskets 11, 12, current collector plates 13, 14, and clamping plates 15, 16. The MEA1 is supported by gaskets 11, 12. The MEA1 11 supported by the gaskets 11, 12 is sandwiched between the current collector plates 13, 14. The current collector 13 exists between the MEA 1 and the clamping plate 15. The current collector 14 exists between the MEA 1 and the clamping plate 16. The electrochemical cell 10 is produced on the both sides of MEA by mounting current collector plates 13, 14 and clamping plates 15, 16 via gaskets 11, 12 and clamping the MEA at appropriate pressure.

Figure 7:
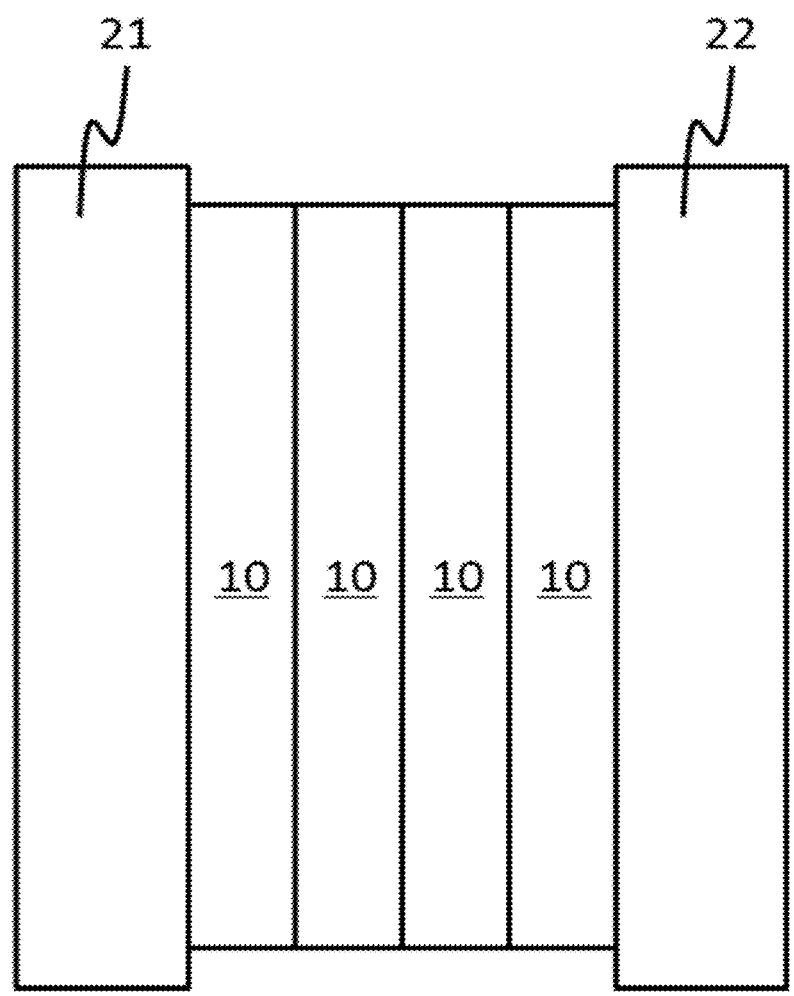
FIG. 7 is a sectional view of a stack according to an embodiment.

The configuration and the manufacturing method of a stack according to the present embodiment will briefly be described using FIG. 7. A stack 20 has a configuration in which a plurality of electrochemical cells 10 is connected in series. A stack is produced by mounting clamping plates 21, 22 on both ends of an electrochemical cell and clamping the electrochemical cell at appropriate pressure.

EXAMPLES

Hereinafter, examples and comparative examples are described.

Tables 1A and 1B are summaries of observational results of the electrodes, evaluation results of PEMEC cells, etc. of examples 1 to 7, and comparative examples 1 to 3.

TABLE 1A

|  | First catalyst layer | | | Second catalyst layer | | |
| --- | --- | --- | --- | --- | --- | --- |
|  | Structure | Main composition and metal catalyst | Amount mg/cm$^2$ | Structure | Main composition and metal catalyst | Amount mg/cm$^2$ |
| Example 1 | laminated | iridium oxide | 0.5 | porous | iridium oxide | 0.15 |
| Example 2 | laminated | iridium oxide | 0.5 | porous | platinum | 0.15 |
| Example 3 | laminated | iridium oxide | 0.5 | laminated | platinum | 0.15 |
| Example 4 | porous | iridium oxide | 0.5 | porous | platinum | 0.15 |
| Example 5 | laminated | iridium oxide platinum | 0.35 0.15 | laminated | platinum | 0.15 |
| Example 6 | laminated | iridium oxide platinum | 0.35 0.15 | porous | platinum | 0.15 |
| Example 7 | laminated | iridium oxide platinum | 0.35 0.15 | porous | platinum | 0.15 |
| Comparative example 1 | laminated | iridium oxide | 0.65 | — | — | — |
| Comparative example 2 | laminated | iridium oxide | 0.5 | porous | platinum | 0.15 |
| Comparative example 3 | — | — | — | porous | iridium oxide | 0.65 |

TABLE 1B

|  | Second catalyst layer Average distance between catalyst units nm | Water electrolysis cell voltage (Vn) V | Stability 1 Voltage regulation | Stability 2 Degradation rate |
| --- | --- | --- | --- | --- |
| Example 1 | 30 | 2.4 | A | A |
| Example 2 | 50 | 2.4 | A | A |
| Example 3 | 80 | 2.3 | A | A |
| Example 4 | 100 | 2.3 | A | A |
| Example 5 | 150 | 2.3 | A | A |
| Example 6 | 500 | 2.4 | A | A |
| Example 7 | 1000 | 2.4 | A | A |
| Comparative example 1 | — | 2.5 | C | B |
| Comparative example 2 | <10 | 2.5 | C | B |
| Comparative example 3 | 200 | 2.8 | C | C |

Manufacture of Electrode (Manufacture of PEMEC Standard Negative Electrode)

Carbon paper Toray 060 (manufactured by Toray Industries, Inc.) having a carbon layer with a thickness of not less than 1 μm and not more than 50 μm was prepared as the base material. A catalyst layer including catalyst units having a laminated structure including a void layer was formed on the base material by sputtering method such that loading density of platinum catalyst became 0.1 mg/cm$^2$ to yield an electrode having a porous catalyst layer. The electrode was used as a standard electrode in the examples 1 to 7, and comparative examples 1 to 3.

Manufacture of PEMEC Positive Electrode
Examples 1 to 7, Comparative Examples 1 to 3

As a base material, a titanium mesh base material subjected to surface treatment was prepared. An electrode having a catalyst layer was obtained on the base material by spattering method. In spattering, its process was adjusted so that the configuration of the catalyst unit and the thickness of the catalyst layer became the values illustrated in above Table 1A. In some cases, a heat treatment was performed at 300 to 500° C. for 30 min to 4 h.

Porosity, average height of catalyst units, and average distance between catalyst units of each of the manufactured electrodes were evaluated as described below. First, samples of nine spots were cut out from each of the electrodes obtained in examples 1 to 7, and comparative example 1 to 3 (FIG. 4). Next, a sample was cut from the center of each of the samples of the 9 spots to manufacture samples for SEM observation. Each of the nine samples of each electrode was observed using a SEM at three portions. SEM images magnified by 2000 to 300000 times were obtained, and catalyst and fine pores were discriminated on the basis of their contrast. In the examples and comparative examples, the thickness of the catalyst layer was measured using the SEM photographs. Specifically, by using the SEM images magnified by 20000 to 50000 times obtained at the above portions, as illustrated in FIG. 6, the thickness of the catalyst layer was measured at three points from each view, and the average value of the measurement values of the above each sample was calculated as the average thickness of the catalyst layer of the electrode. On the basis of the thickness of the catalyst layer obtained in this manner, the thickness of noble metal catalyst was calculated on the basis of the amount (g) and density of the noble metal catalyst of each electrode to obtain the porosity of the catalyst layer (1—thickness of noble metal catalyst/thickness of catalyst layer). Density of catalyst is capable of being theoretically or experimentally obtained when there is no literature value for the catalyst. Note that 21.45 g/cm$^3$ and 11.66 g/cm$^3$, which are literature values, were employed as the densities of platinum catalyst and iridium oxide catalyst used in the examples 1 to 7 and comparative examples 1 to 3, respectively.

The catalyst layers of the examples 1 to 7 and comparative examples 1 to 3 were observed using an SEM, and it was confirmed that each of the catalyst layers has a porous structure or has a laminated unit including a void layer, and that the porosity of each of the catalyst layers is 80 to 95 vol %.

The circumscribed circle diameter of crystal grain of the catalyst was obtained by obtaining an XRD pattern of electrode by an X ray diffraction method (XRD), measuring half bandwidth of characteristic peaks belonging to the catalyst, and using Scherrer method.

The circumscribed circle diameter of catalyst crystal grain of each of the examples 1 to 7 and comparative examples 1 to 3 is 3 to 20 nm.

The average height of catalyst units and the average distance between catalyst units near the electrolyte membrane were obtained by the method similar to that in the preceding sentence. The average value of the measurement values at every spots of each electrode shall be the average value of the electrode, and are summarized in Table 1B. Note that it was confirmed that there is almost no gap between the catalyst units near the base material of each electrode and that the catalyst units are coupled.

Manufacture of MEA for PEMEC

A cut piece having a square shape of 4 cm×4 cm was cut out from the above PEMEC standard negative electrode and various PEMEC positive electrodes. MEAs for various PEMECs were obtained by matching standard electrode and electrolyte membrane (Nafion 117 (manufactured by Du pont Co., Ltd.)) to each of the various positive electrodes, and by bonding them by thermocompression (the area of the electrode is about 16 cm$^2$, thermocompression conditions: 140° C. to 300° C., pressure 10 to 200 kg/cm$^2$, 10 s to 5 min).

Manufacture of Single PEMEC Cell

The obtained MEA was set between two separators provided with a flow path to manufacture a single PEMEC cell (electrochemical cell).

Water electrolysis performance and stability of the PEMEC cell were evaluated by using the manufactured single cell.

To the obtained single cell, the temperature of the cell was kept at 60° C., and water was supplied to the positive electrode. A voltage of 1.3 to 2.5 V was applied to the single cell, and water electrolysis is performed for about 5 hours as conditioning of the MEA. Then, a voltage was applied to the single cell so that the current density became 2.5 A/cm$^2$, and the voltage (V) after water electrolysis was continuously performed for one hour was regarded as a voltage property index of water electrolysis, and the voltage of each electrode is summarized in Table 1B.

As for water electrolysis stability, water electrolysis of the PEMEC cell was performed (water supply to positive electrode, current density 2.5 A/cm$^2$) for ten minutes and water electrolysis was interrupted (switching supply to positive electrode from water to nitrogen) for ten minutes as one cycle, and the one cycle was performed by 2000 cycles. Given that the voltage at start of each cycle is start voltage (V0), the voltage after each cycle is finished is finish voltage (Vf), and the voltage regulation ((V0−Vf)/V0) of each cycle was measured, and the average voltage regulation of 2000 cycles was obtained as stability index 1 of the PEMEC cell. Furthermore, given that the difference between the voltage (Vf1) after first cycle and the voltage (Vf2000) after 2000 cycles is ΔV, and degradation rate (=ΔV/Vf1) was obtained as stability index 2 of the PEMEC cell. The stability was evaluated by the following standards, and the evaluated results of each electrode are summarized in Table 1B.

voltage regulation<7% A; voltage regulation 8 to 15% B; voltage regulation>15% C; degradation rate<7% A; degradation rate 8 to 15% B; degradation rate>15% C;

As illustrated in Table 1B, the electrolysis voltage (V) necessary for single water electrolysis cell is low in the MEAs of the examples 1 to 7 as compared with that in the MEAs of the comparative examples 1 to 3, and efficiency of water electrolysis is good in the MEAs of the examples 1 to 7. Also, as for stability, the voltage regulation and deterioration rate are lower than those of the comparative examples. The MEAs of the comparative examples 1, 2 are inferior in stability. This is probably because no catalyst units having high dispersion degree exist near the electrolyte membrane, or dispersion degree of catalyst units is insufficient. In the MEA of the comparative example 3, degradation of the water electrolysis performance is aggravated. This is probably due to catalyst layer having catalyst units having low dispersion degree.

According to at least one of the embodiments described above, a small amount of noble metal makes the electrode having catalyst units having a high dispersion degree near the electrolyte membrane provide an electrode or a membrane electrode assembly having high stability. At the same time, an electrochemical cell employing the electrode or the membrane electrode assembly makes it possible to exert high stability and high durability.

In the specification, some of elements are described only by element symbols.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode comprising:
   a base material; and
   a catalyst layer provided on the base material, the catalyst layer including a plurality of catalyst units having a porous structure, wherein
   the catalyst layer comprises a first catalyst layer and a second catalyst layer, wherein the first catalyst layer is located between the base material and the second catalyst layer, the first catalyst layer including a plurality of first catalyst units dispersed at a first dispersion degree, the plurality of the first catalyst units being a plurality of carrierless catalyst units having a porous structure or a laminated structure including a void layer, the second catalyst layer including a plurality of second catalyst units dispersed at a second dispersion degree, the plurality of the second catalyst units being a plurality of carrierless catalyst units having a porous structure or a laminated structure including a void layer,
   the first catalyst layer and the second catalyst layer are laminated,
   the second catalyst layer has a catalyst structure in which columnar structures extending in the laminated direction of the first catalyst layer and the second catalyst layer are bundled, the bundled columnar structures are arranged in a direction parallel to the first catalyst layer, the second dispersion degree is 10 nm or more different from the first dispersion degree, the first catalyst units have the laminated structure including a plurality of nanosheet-like catalysts and void layers each existing between the two corresponding nanosheet-like catalysts, the laminated structure is directly connected with the bundled columnar structures, and an average height of the second catalyst units is not less than 50 nm and not more than 800 nm.

2. The electrode according to claim 1, wherein the second dispersion degree is higher than the first dispersion degree.

3. The electrode according to claim 1, wherein the catalyst layer has a porosity of not less than 50 vol % and not more than 95 vol %.

4. The electrode according to claim 1, wherein an average distance between the second catalyst units in the second catalyst layer is not less than 30 nm and not more than 2000 nm.

5. The electrode according to claim 1, wherein the first catalyst units of the first catalyst layer include at least one of iridium oxide, ruthenium oxide, tantalum oxide, titanium oxide, platinum, and platinum oxide.

6. The electrode according to claim 1, wherein not less than 50 vol % of the second catalyst units is platinum, and not less than 60 vol % of the first catalyst units is iridium oxide.

7. A membrane electrode assembly comprising the electrode according to claim 1 and an electrolyte membrane.

8. The assembly according to claim 7, wherein the second catalyst layer exists between the first catalyst layer and the electrolyte membrane.

9. The assembly according to claim 7, wherein the electrolyte membrane is in physical contact with the second catalyst layer.

10. An electrochemical cell comprising the membrane electrode assembly according to claim 7.

11. A stack including the electrochemical cell according to claim 10.

12. The electrode according to claim 1, wherein the average distance between the plurality of the first catalyst units expressed D1, the average distance between the plurality of the second catalyst units expressed D2, D1 and D2 satisfies 0.00<D1/D2<0.01.

13. The electrode according to claim 1, wherein the average distance between the plurality of the first catalyst units is expressed D1, the average distance between the plurality of the second catalyst units is expressed D2, D1 and D2 satisfies 0.000<D1/D2<0.006.

14. The assembly according to claim 7, wherein the second catalyst layer has a catalyst structure in which columnar structures extending in the laminated direction of the first catalyst layer and the second catalyst layer are bundled, and the electrolyte membrane exists between the columnar structures, an interface between the second catalyst layer and the electrolyte membrane is uneven, and the bundled columnar structures directly connect the first catalyst layer and the electrolyte membrane.

* * * * *